(12) United States Patent
Emmendorfer et al.

(10) Patent No.: US 8,005,095 B2
(45) Date of Patent: Aug. 23, 2011

(54) CARRIER ETHERNET OVER DOCSIS

(75) Inventors: Michael Emmendorfer, St. Peters, MO (US); Thomas J. Cloonan, Lisle, IL (US); Erich Arnold, Naperville, IL (US)

(73) Assignee: ARRIS Group, Inc., Suwanee, GA (US)

( * ) Notice: Subject to any disclaimer, the term of this patent is extended or adjusted under 35 U.S.C. 154(b) by 64 days.

(21) Appl. No.: 12/432,518

(22) Filed: Apr. 29, 2009

(65) Prior Publication Data
US 2009/0274156 A1 Nov. 5, 2009

Related U.S. Application Data

(60) Provisional application No. 61/048,879, filed on Apr. 29, 2008.

(51) Int. Cl.
*H04L 12/28* (2006.01)

(52) U.S. Cl. ............... 370/395.53; 370/392.21; 370/466

(58) Field of Classification Search ............. 370/395.53, 370/466, 395.2, 395.21
See application file for complete search history.

(56) References Cited

U.S. PATENT DOCUMENTS

| | | | |
|---|---|---|---|
| 6,522,627 B1 | 2/2003 | Mauger | |
| 7,028,183 B2 | 4/2006 | Simon et al. | |
| 7,054,319 B2 * | 5/2006 | Akahane et al. | 370/395.53 |
| 7,266,124 B2 | 9/2007 | Kim et al. | |
| 7,324,515 B1 * | 1/2008 | Chapman | 370/392 |
| 7,339,929 B2 * | 3/2008 | Zelig et al. | 370/390 |
| 7,409,450 B2 | 8/2008 | Jorgensen | |
| 7,468,956 B1 | 12/2008 | Leelanivas et al. | |
| 7,516,224 B2 | 4/2009 | Guichard et al. | |
| 7,535,856 B2 | 5/2009 | Booth et al. | |
| 7,701,951 B2 * | 4/2010 | Chapman et al. | 370/395.52 |
| 7,710,902 B2 | 5/2010 | Vasseur et al. | |
| 2002/0010866 A1 | 1/2002 | McCullough et al. | |
| 2002/0133618 A1 * | 9/2002 | Desai et al. | 709/238 |
| 2004/0037279 A1 * | 2/2004 | Zelig et al. | 370/390 |
| 2004/0081203 A1 | 4/2004 | Sodder et al. | |
| 2004/0174887 A1 * | 9/2004 | Lee | 370/395.53 |
| 2005/0265338 A1 * | 12/2005 | Chapman et al. | 370/389 |
| 2005/0265397 A1 | 12/2005 | Chapman et al. | |
| 2006/0047851 A1 * | 3/2006 | Voit et al. | 709/239 |
| 2006/0092955 A1 | 5/2006 | Durbin et al. | |
| 2006/0126644 A1 | 6/2006 | Akahane et al. | |
| 2006/0187900 A1 | 8/2006 | Akbar | |
| 2007/0098006 A1 | 5/2007 | Parry et al. | |
| 2007/0124488 A1 | 5/2007 | Baum et al. | |
| 2007/0171918 A1 * | 7/2007 | Ota et al. | 370/395.53 |
| 2008/0095155 A1 * | 4/2008 | Danzig | 370/389 |
| 2008/0123651 A1 | 5/2008 | Vasseur et al. | |
| 2008/0159140 A1 | 7/2008 | Robinson et al. | |

(Continued)

OTHER PUBLICATIONS

Cisco Systems, Cisco IOS MPLS Virtual LAN Service, copyright 1992-2004.

(Continued)

*Primary Examiner* — Kwang B Yao
*Assistant Examiner* — Candal Elpenord
(74) *Attorney, Agent, or Firm* — Troy A. Van Aacken; Robert J. Starr

(57) ABSTRACT

A network includes a provider edge device with logic to encapsulate Ethernet frames received from customer equipment into Data Over Cable Service Interface Specification (DOCSIS) frames using Layer Two Tunneling Protocol. The provider edge device further includes logic to implement a virtual switch instance (VSI).

12 Claims, 16 Drawing Sheets

U.S. PATENT DOCUMENTS

2009/0274156 A1 11/2009 Emmendorfer et al.
2009/0290543 A1 11/2009 Desai et al.

OTHER PUBLICATIONS

"USPTO Office Action", U.S. Appl. No. 12/082,498, Nov. 6, 2009, Michael Emmendorfer, "entire document".

"USPTO Office Action", U.S. Appl. No. 12/082,498, Dec. 23, 2010, Michael Emmendorfer, "entire document".

"Notice of References Cited", U.S. Appl. No. 12/082,498, Nov. 6, 2009, Emmendorfer et al. "entire document".

"USPTO Office Action", U.S. Appl. No. 12/082,498, May 26, 2010, Michael Emmendorfer, "entire document".

* cited by examiner

CARRIER ETHERNET OVER DOCSIS

PRIORITY CLAIM

This application claims priority under 35 USC 119 to U.S. application Ser. No. 61/048,879 filed on Tuesday, Apr. 29, 2008, which is presently filed, and which is incorporated herein by reference in its entirety.

BACKGROUND

The cable industry and service providers worldwide have embraced Layer 2 Ethernet services as defined by the Metro Ethernet Forum (MEF). The Metro Ethernet Forum has defined a new class of Ethernet, called "Carrier Ethernet" which includes support for Time Division Multiplexing (TDM) Emulation services and several Ethernet service types, attributes, and parameters to support the adoption of Ethernet beyond the local area network (LAN) to a Carrier-provided service for business and residential end-users. Industry drivers for Carrier Ethernet include service providers, equipment manufacturers, the Metro Ethernet Forum (MEF), the Internet Engineering Task Force (IETF), the Institute of Electrical and Electronics Engineers (IEEE), and the Telecommunication Standardization Sector of the International Telecommunications Union (ITU-T). It is critical that worldwide standards are defined so that service providers and equipment suppliers may offer standards-based products to end-users. Service providers, including cable Multiple System Operators (MSOs), have offered Metro Ethernet services for years. Recently the Metro Ethernet Forum emerged defining services, technical specifications, and certification standards for carriers and vendors alike; this was pivotal in worldwide adoption of Carrier Ethernet services. Today, telecommunications providers are positioning Carrier Ethernet services against legacy technologies like Frame Relay, TDM Private Line, Synchronous Optical Networking (SONET), and even newer technologies such as Layer 3 MPLS VPNs (also known as IP VPNs).

The challenge facing the cable industry is to define a network architecture that enables the full range of MEF-defined Carrier Ethernet services that may be carried over a DOCSIS network infrastructure with the least impact on capital investment and operations, while assuring immediate network-wide readiness, support for end-to-end Quality of Service and service management.

The following acronyms may appear in the following detailed description:
BSoD—Business Services over DOCSIS
CableLabs—Cable Television Laboratories, Inc.
CE—Customer Edge
CIR—Committed Information Rate
CMTS—Cable Modem Termination System
CPE—customer premise equipment
DOCSIS—Data over Cable Service Interface Specification; CableLabs Certified™ Cable
Modem Project
E-Line—Ethernet Line
ELAN—Ethernet Local Area Network
EPL—Ethernet Private Line
EVC—Ethernet Virtual Circuit
EVPL—Ethernet Virtual Private Line
EVP-Tree—Ethernet Virtual Private-Tree
IEEE—Institute of Electrical and Electronics Engineers, Inc.
IETF—Internet Engineering Task Force
ITU-T—Telecommunication Standardization Sector of the International Telecommunications Union
L2TP—Layer 2 Tunneling Protocol
L2TPV2/L2TPv3—Layer 2 Tunneling Protocol (L2TP) version 2 and version 3
LAN—Local Area Network
MP-to-MP—Multipoint-to-Multipoint
MPLS—Multi Protocol Label Switching
MSOs—Multiple System Operators
OAM&P—Operation, Administration, Maintenance and Provisioning
PacketCable™—CableLabs-led initiative to develop interoperable interface specifications for delivering advanced, real-time multimedia services over two-way cable plant
PSN—Packet Switched Network
Pt-to-MP—Point-to-Multipoint
PWE—Pseudo wire Emulation
PWE3—Pseudowire Emulation Edge to Edge
QoS—Quality of Service
RFC—Request for Comment
SONET—Synchronous Optical Networking
TDM—Time Division Multiplexing
ToS—Type of Service
UNI—User Network Interface
VLAN—Virtual Local Area Network
VPLS—Virtual Private LAN Service
VPWS—Virtual Private Wire Service

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to influence the operation of a device. Software, hardware, and firmware are examples of logic. Hardware logic may be embodied in circuits. In general, logic may comprise combinations of software, hardware, and/or firmware.

Those skilled in the art will appreciate that logic may be distributed throughout one or more devices, and/or may be comprised of combinations of instructions in memory, processing capability, circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic is a design decision that will vary according to implementation.

Figure 1:
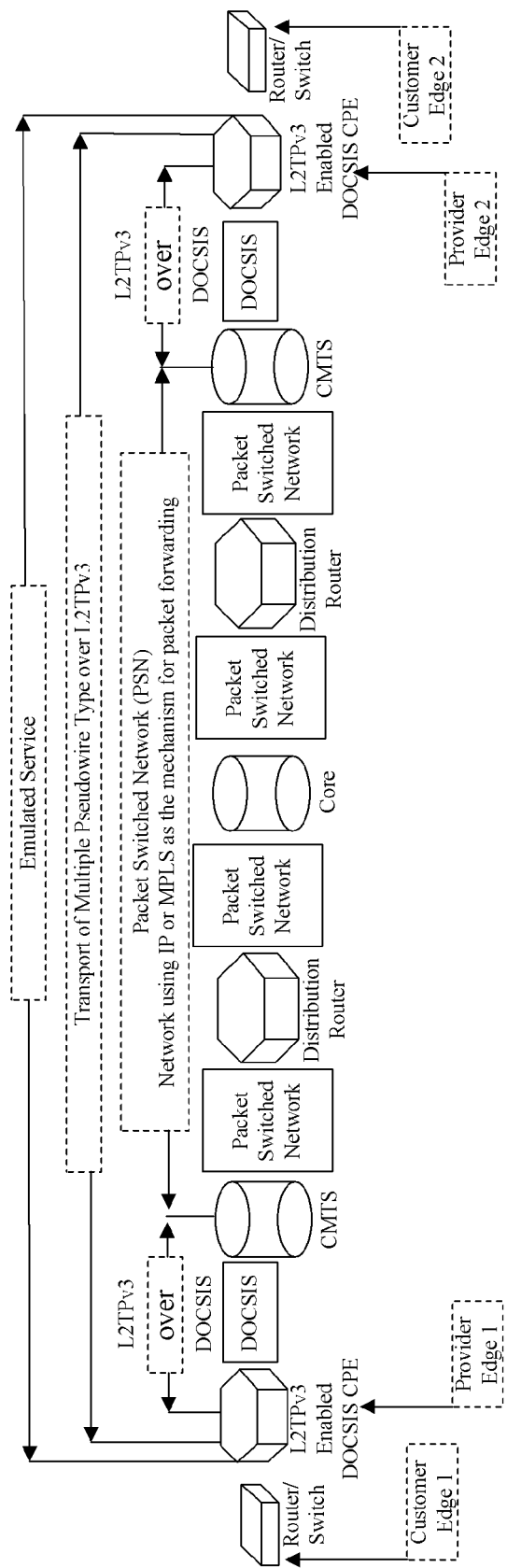
FIG. 1 shows an illustration of an embodiment of an End-to-End Architecture complete with communicating with an undefined Pseudowire Type but similar Layer 2 formats providing Point-to-Point (Pt-to-Pt) connectivity.

Described herein are various architectures for Carrier Ethernet over DOCSIS (CEoD). These CEoD architectures inherently support Point-to-Point (Pt-to-Pt) connections with Layer 2 Tunneling Protocol Version 3 (L2TPv3) enabled devices (routers, switches, multi-layer switch routers, and other DOCSIS devices with L2TPv3 enabled). The described CEoD architectures broadly support a multitude of features and functionality to include Point-to-Multipoint (Pt-to-MP) and Multipoint-to-Multipoint (MP-to-MP) Layer 2 tunnels over a CEoD enabled DOCSIS CPE devices. The described architectures push the intelligence to the network edge, and therefore do not require network-wide upgrades and thus enable the network to remain transparent. The Enhanced Customer Premise Equipment (CPE) that supports these architectures may be optionally configured with a Virtual Switch Instance (VSI) and uses L2TPv3 layer 2 encapsulation and IP Packet switch transport to provide support for both Point-to-Multipoint (Pt-MP) and true Multipoint-Multipoint (MP-to-MP) services. For example, an Enhanced CPE with VSI may support services defined by the Metropolitan Ethernet Forum (MEF)'s for E-LAN Services and the IEFT's Virtual Private LAN Service (VPLS). The VSI is not required for the Enhanced CPE to support P-P, P-MP, or even MP-MP connections, but without the VSI the Enhanced CPE may not emulate the IETF and MEF defined multipoint services. The VSI may provide, among other functions: basic switching, MAC address learning, flooding unknown frames, traffic replication, and aging MAC addresses FIG. 1 shows an illustration of an embodiment of an End-to-End Architecture complete with communicating with an undefined Pseudowire Type but similar Layer 2 formats providing Point-to-Point (Pt-to-Pt) connectivity. The CE ingress point at the L2TPv3 enabled DOCSIS CPE (Provider Edge PE 1) receives the Layer 2 traffic and performs encapsulation into DOCSIS frames and service flows. In this illustration the transport is DOCSIS over a shared coaxial network and the emulated service is transported across a Packet Switched Network (PSN) to corresponding L2TPv3 enabled DOCSIS CPE endpoint labeled PE 2 and CE 2.

Figure 2:
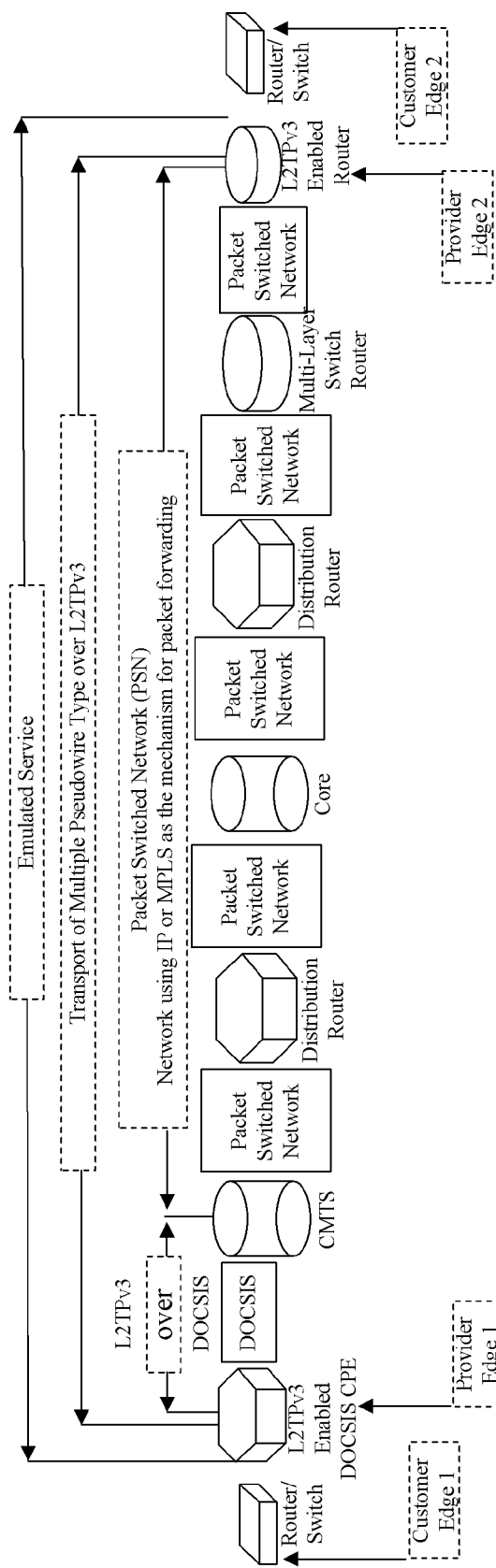
FIG. 2 shows a similar embodiment as in FIG. 1; however the corresponding endpoint Provider Edge (PE) 2 is a Router with L2TPv3 enabled.

FIG. 2 shows a similar embodiment as in FIG. 1; however the corresponding endpoint Provider Edge (PE) 2 is a Router with L2TPv3 enabled. The figure illustrates that the L2TPv3 Enabled DOCSIS CPE may terminate on other L2TPv3 Enabled DOCSIS CPE devices in conformance with the IETF informational and standard track protocols. In this example the router may have L2TPv3 implemented in the Operating System and will service as the Provider Edge 2. This deployment architecture will solve a problem in that the headquarter location may require greater bandwidth than that capable of DOCSIS systems and the use of Optical Ethernet may be deployed.

Figure 3:
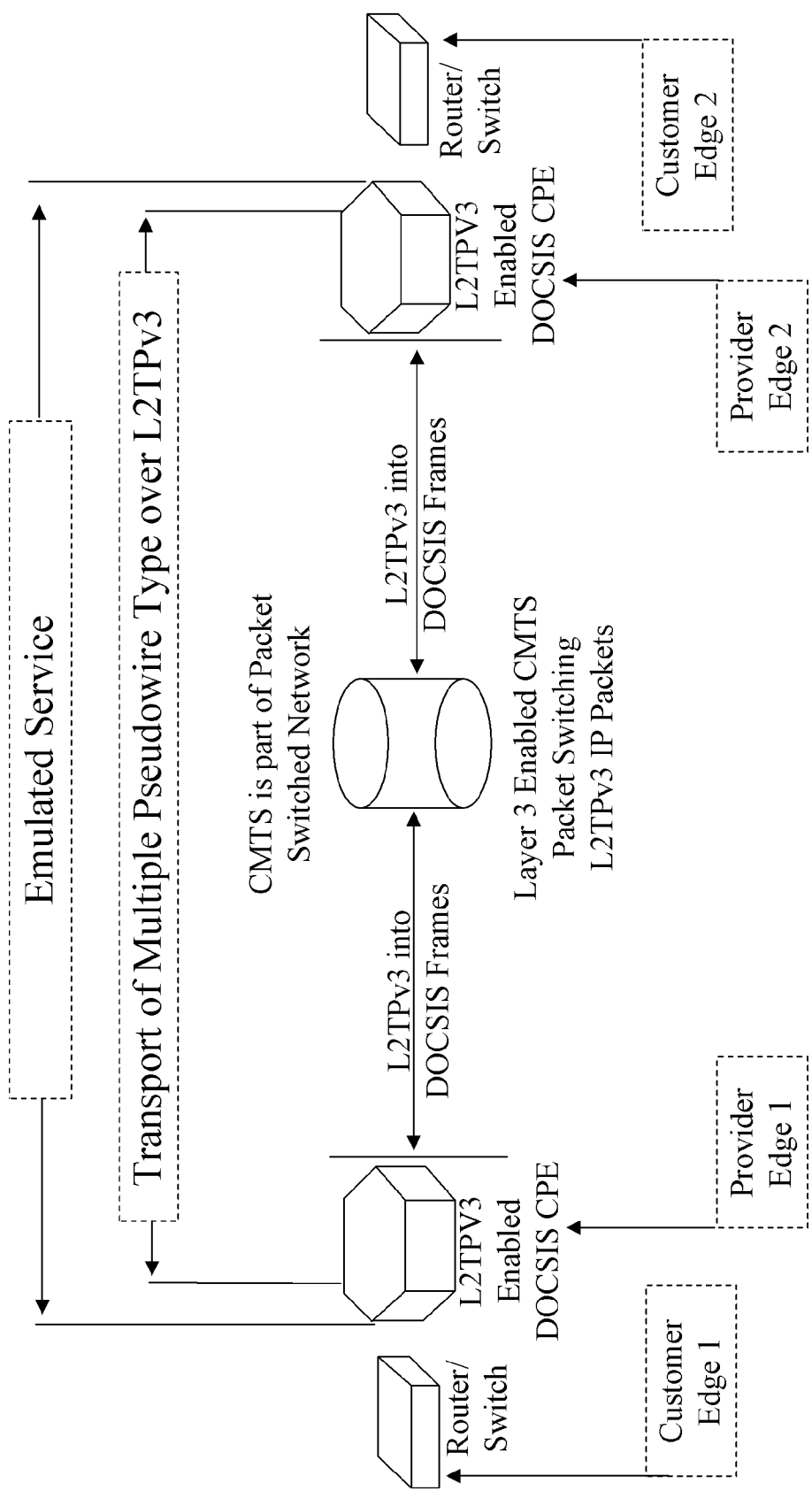
FIG. 3 illustrates an architecture embodiment using an undefined Pseudowire Type Point-to-Point (Pt-to-Pt) connection with L2TPv3 over DOCSIS Encapsulation in the Access and the CMTS which is part of the Packet Switched Network (PSN) transporting L2TPv3 traffic from Provider Edge (PE) 1 to Provider Edge (PE) 2.

FIG. 3 illustrates an architecture embodiment using an undefined Pseudowire Type Point-to-Point (Pt-to-Pt) connection with L2TPv3 over DOCSIS Encapsulation in the Access and the CMTS which is part of the Packet Switched Network (PSN) transporting L2TPv3 traffic from Provider Edge (PE) 1 to Provider Edge (PE) 2.

Figure 4:
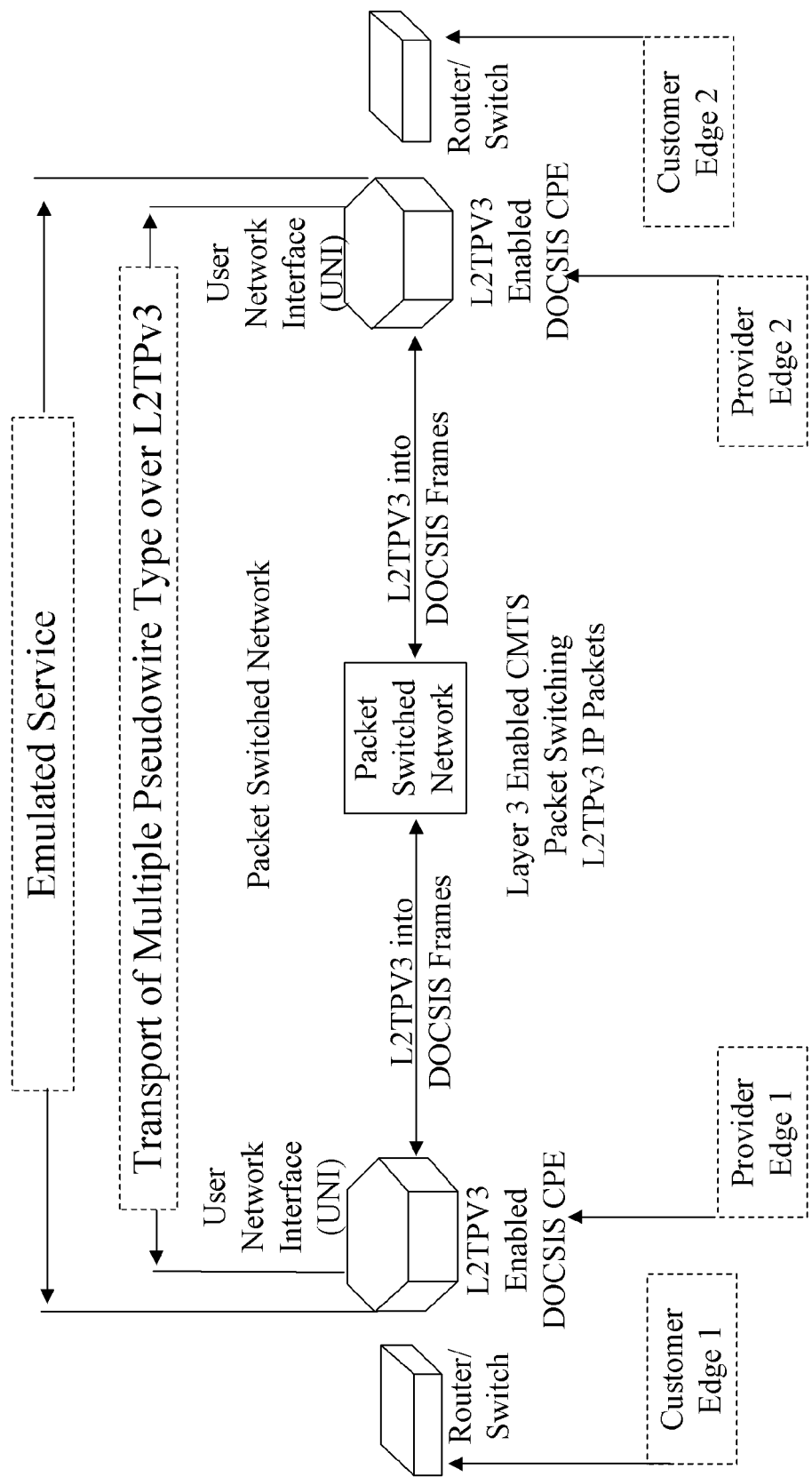
FIG. 4 illustrates an architecture embodiment using an undefined Pseudowire Type Point-to-Point (Pt-to-Pt) connection with L2TPv3 over DOCSIS Encapsulation in the Access and the CMTS which is part of the Packet Switched Network (PSN) transporting L2TPv3 traffic from Provider Edge (PE) 1 to Provider Edge (PE) 2.

FIG. 4 illustrates an architecture embodiment using an undefined Pseudowire Type Point-to-Point (Pt-to-Pt) connection with L2TPv3 over DOCSIS Encapsulation in the Access and the CMTS which is part of the Packet Switched Network (PSN) transporting L2TPv3 traffic from Provider Edge (PE) 1 to Provider Edge (PE) 2. The CMTS has been removed from the illustration to simplify the architecture; the CMTS (not shown) has DOCSIS interfaces for Layer 2 connections to DOCSIS Cable modems and is also part of the packet switched network providing the Layer 3 switching to connect the emulated service endpoints. The term User Network Interface is the demarcation point between the customer and provider network.

Figure 5:
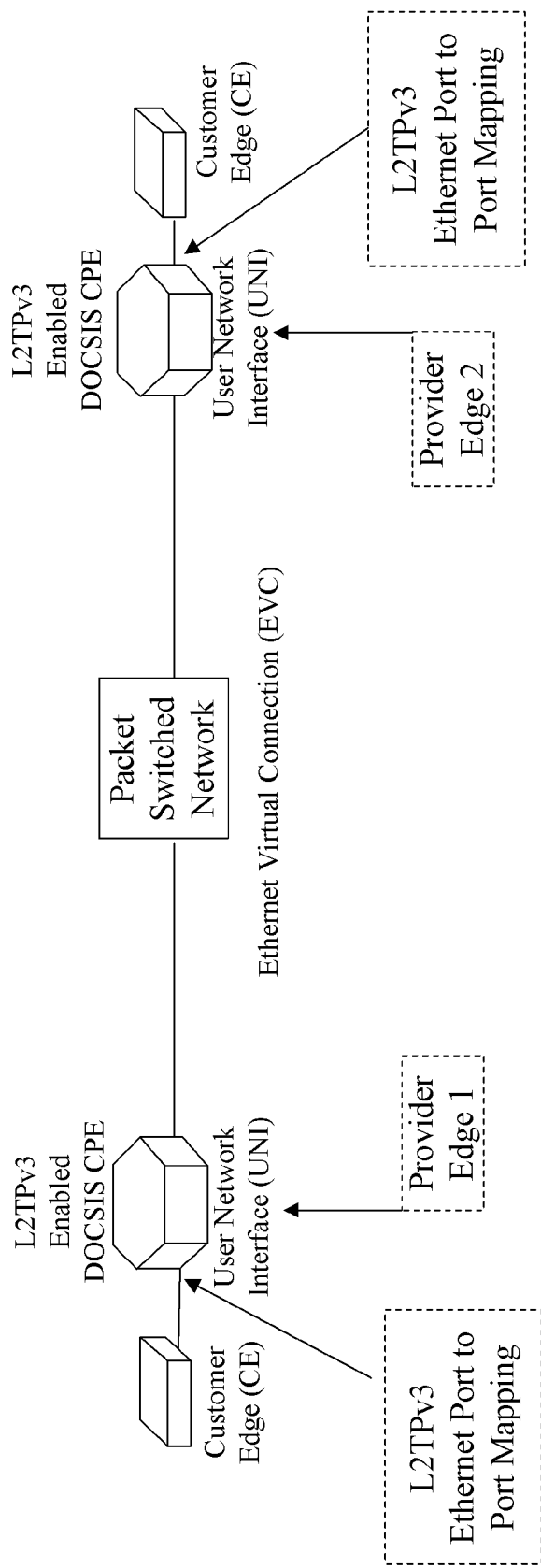
FIG. 5 illustrates an embodiment of an architecture using an Ethernet Pseudowire Type Point-to-Point (Pt-to-Pt) connection with L2TPv3 over DOCSIS Encapsulation in the Access across the Packet Switched Network (PSN) transporting L2TPv3 traffic from Provider Edge (PE) 1 to Provider Edge (PE) 2.

FIG. 5 illustrates an embodiment of an architecture using an Ethernet Pseudowire Type Point-to-Point (Pt-to-Pt) connection with L2TPv3 over DOCSIS Encapsulation in the Access across the Packet Switched Network (PSN) transporting L2TPv3 traffic from Provider Edge (PE) 1 to Provider Edge (PE) 2. In this illustration the L2TPv3 Ethernet Pseudowire Type defines (Pt-to-Pt) Ethernet port to port mapping. This would be compliant with the IETF's Virtual Private Wire Service in that an ingress frame at one UNI can only be an egress frame at the other UNI.

Figure 6:
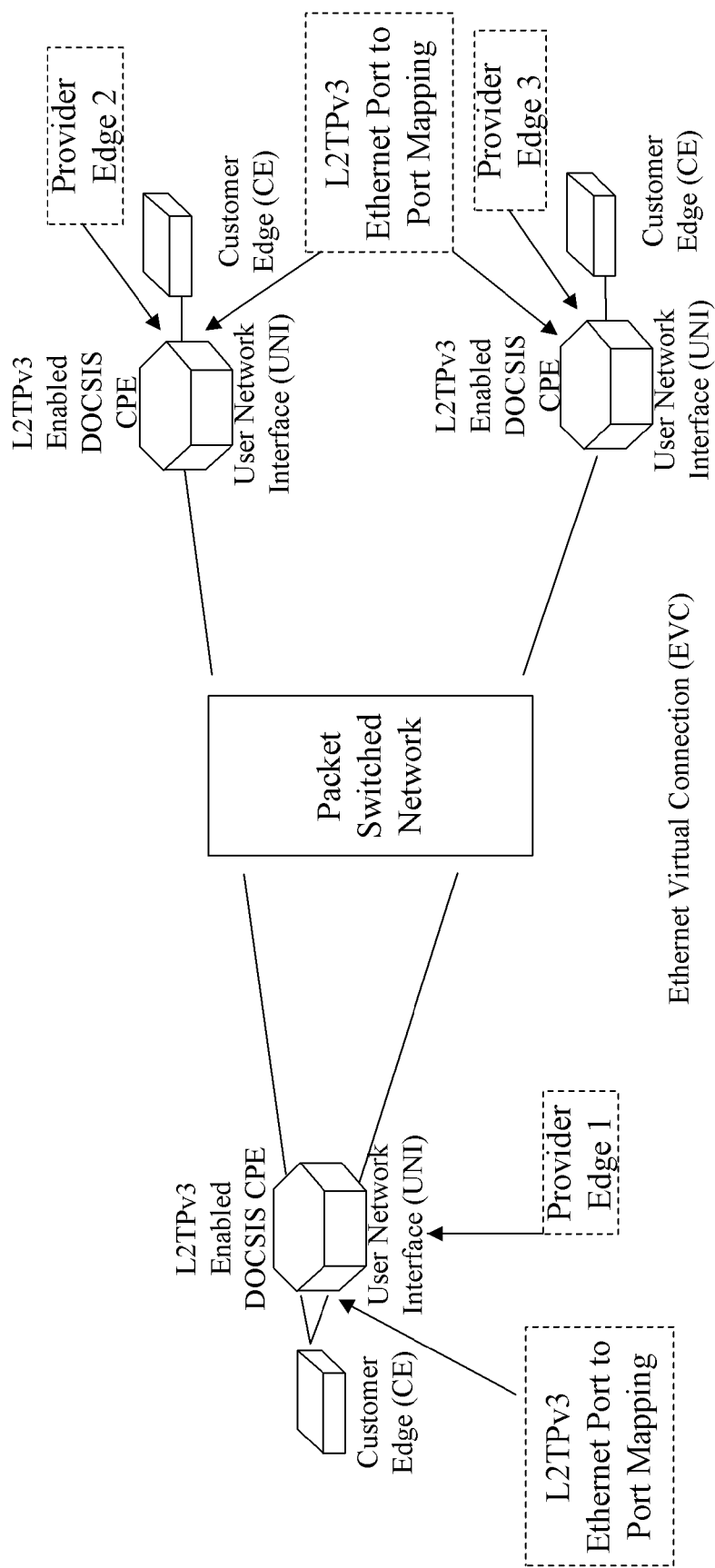
FIG. 6 illustrates an embodiment of an architecture using an Ethernet Pseudowire Type for Point-to-Point (Pt-to-Pt) connections with L2TPv3 over DOCSIS Encapsulation in the Access and the Cable Modem Termination System (CMTS) is par of the Packet Switched Network (PSN) transporting L2TPv3 traffic from Provider Edge (PE) 1 to Provider Edge (PE) 2 as well as Provider Edge (PE) 3.
Figure 7:
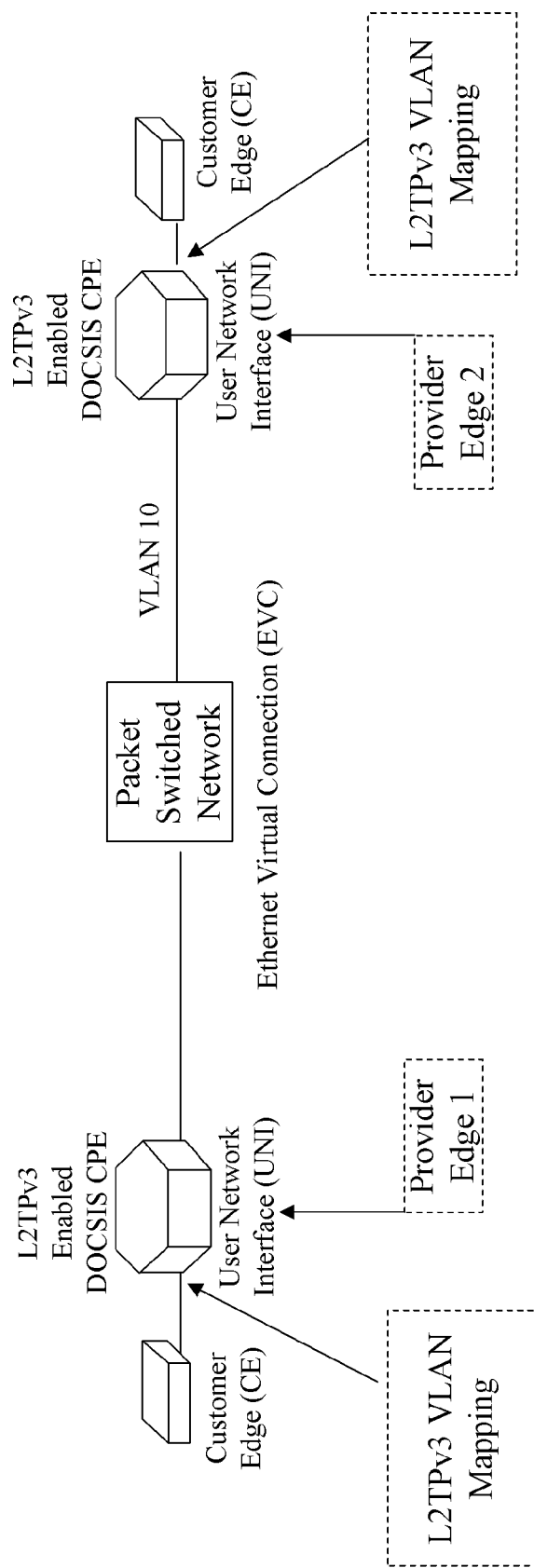
FIGS. 7 and 8 illustrate embodiments of connections defined by Virtual Local Area Network (VLAN) type instead of those mapped by port in FIG. 6.
Figure 8:
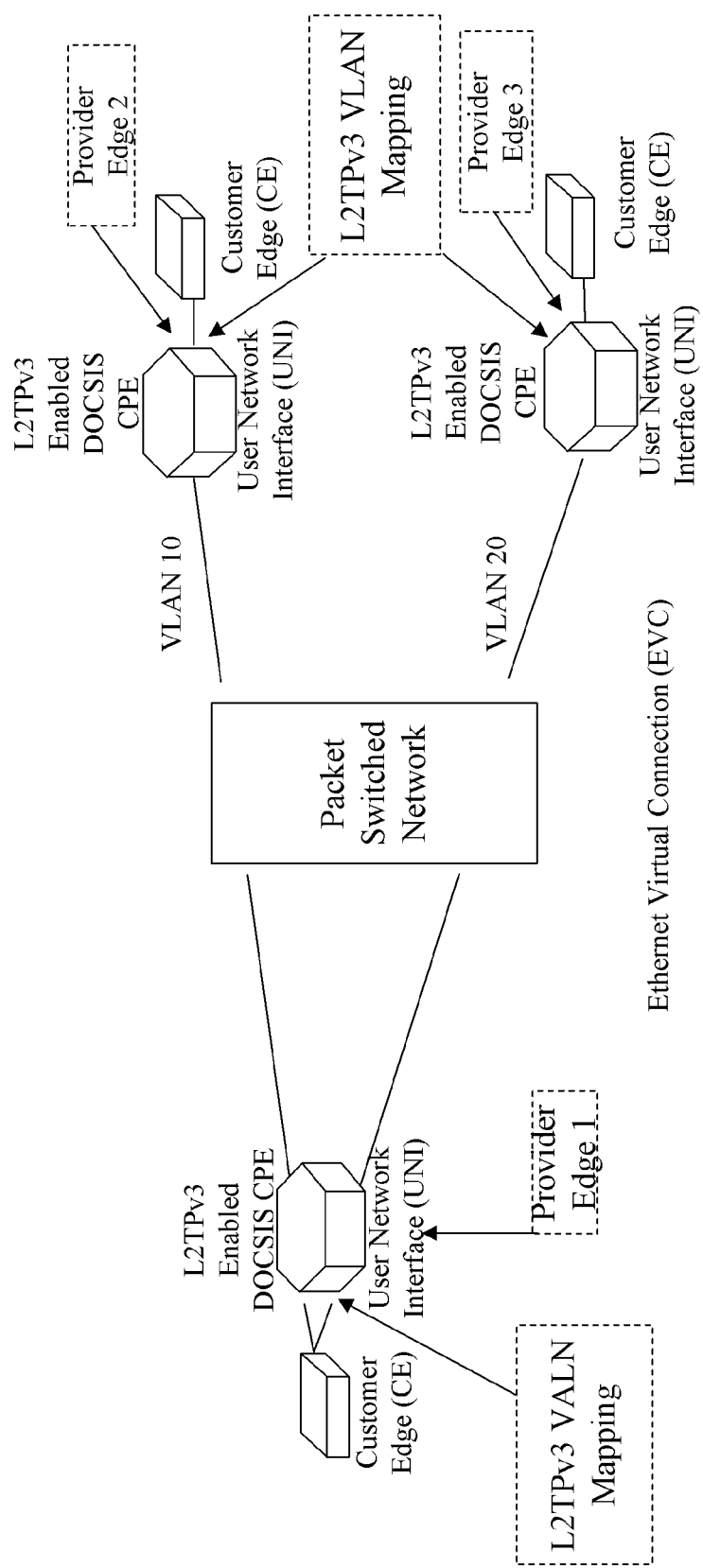

FIG. 6 illustrates an embodiment of an architecture using an Ethernet Pseudowire Type for Point-to-Point (Pt-to-Pt) connections with L2TPv3 over DOCSIS Encapsulation in the Access and the Cable Modem Termination System (CMTS) is par of the Packet Switched Network (PSN) transporting L2TPv3 traffic from Provider Edge (PE) 1 to Provider Edge (PE) 2 as well as Provider Edge (PE) 3. The UNI is the demarcation point between the customer and provider network. In this illustration the L2TPv3 Ethernet Pseudowire Type defines (Pt-to-Pt) Ethernet port-to-port mapping and is a non-multiplexed UNI with two (2) Point-to-Point (Pt-to-Pt) connections between two endpoints, either separate physical endpoint locations or simply two egress ports at the same location. An ingress frame the UNI can only be an egress frame at exactly one other UNI endpoint and although this illustrates a Point-to-Multipoint topology this would not be applicable to a Point-to-Multipoint service. FIGS. 7 and 8 illustrate embodiments of connections defined by Virtual Local Area Network (VLAN) type instead of those mapped by port in FIG. 6.

Figure 9:
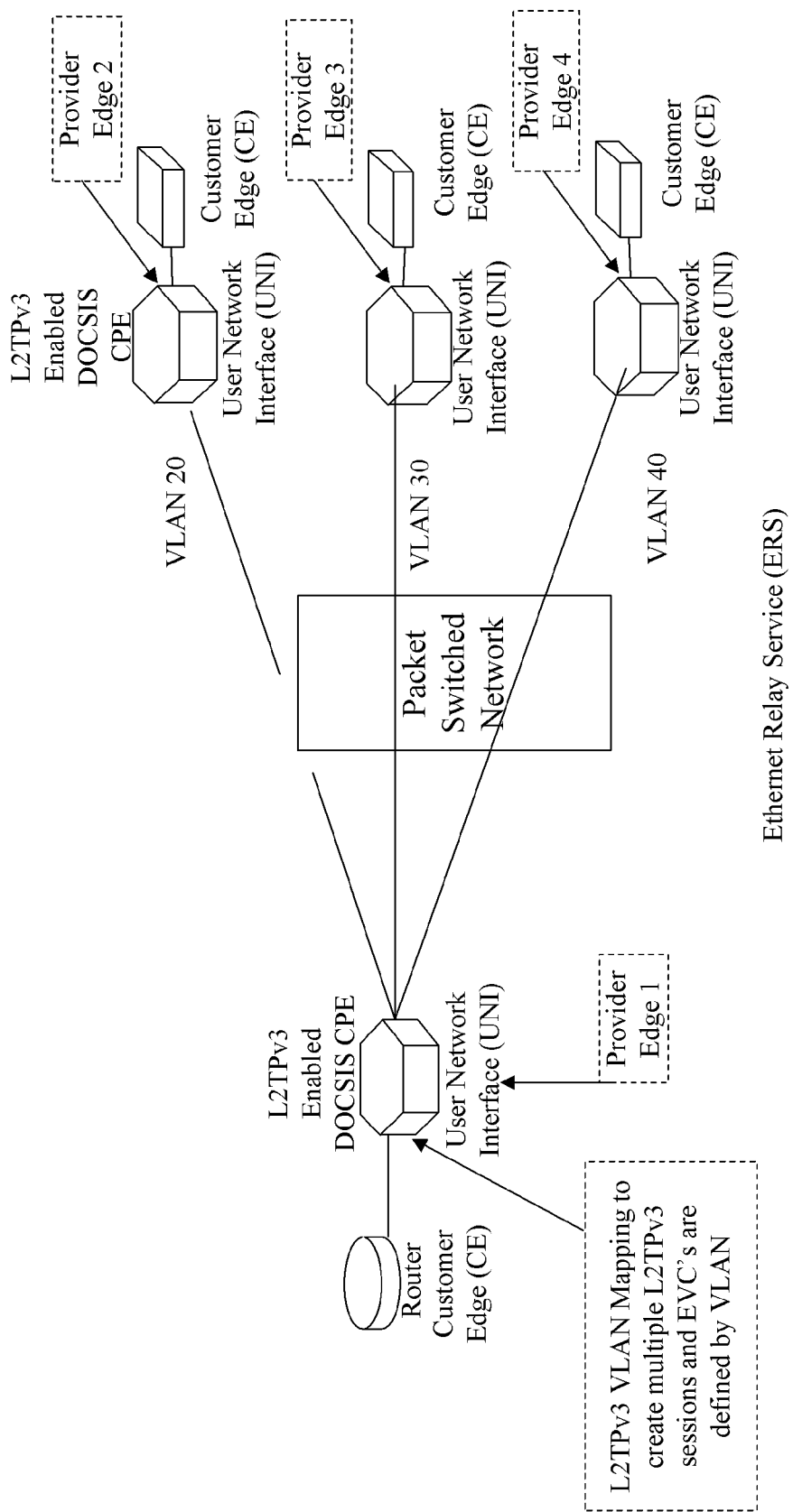
FIG. 9 illustrates an embodiment of an architecture using an Ethernet Pseudowire Type Point-to-Multipoint (Pt-to-MP) connection with L2TPv3 over DOCSIS Encapsulation in the Access.
Figure 10:
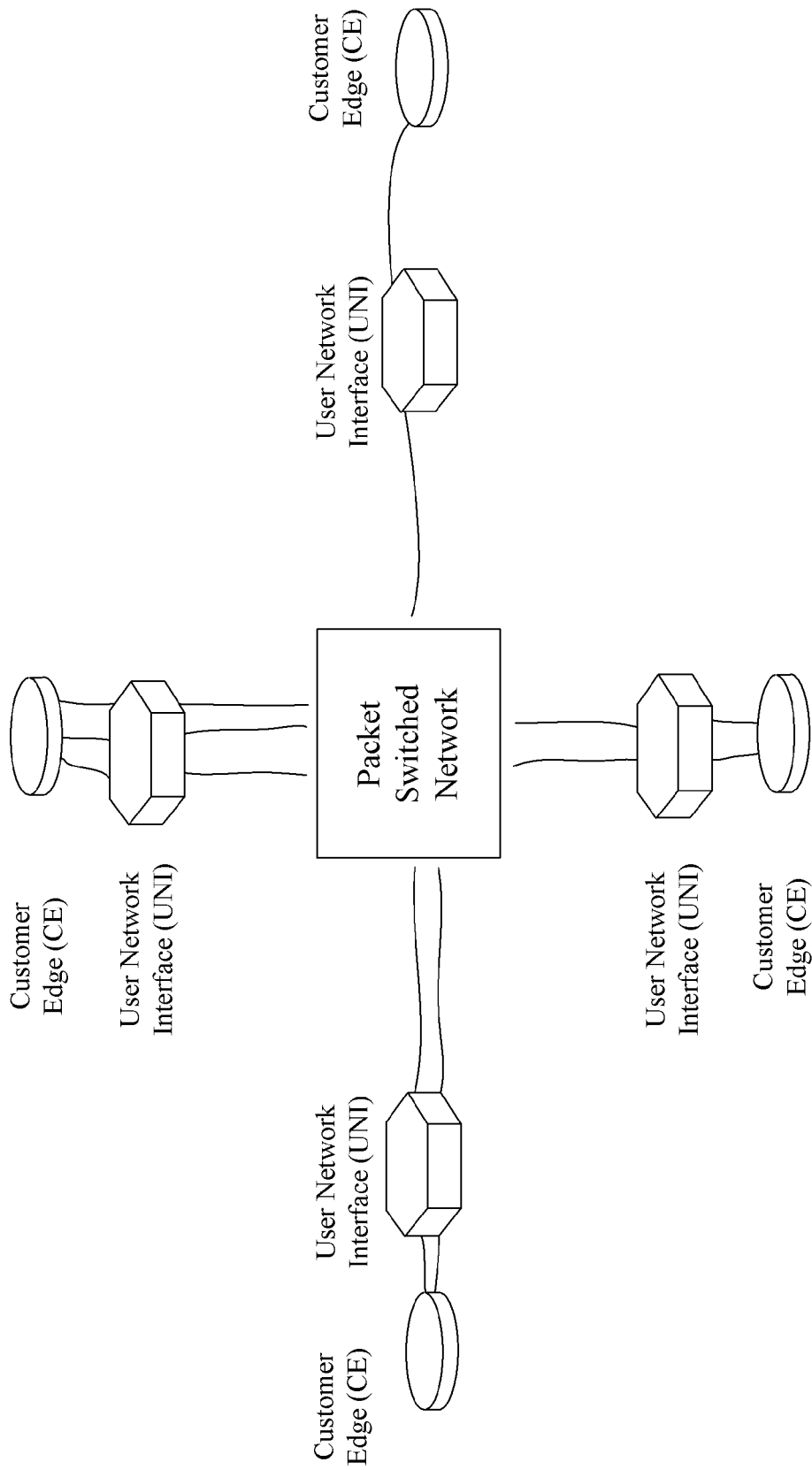
FIG. 10 illustrates an embodiment of an architecture using an Ethernet Pseudowire Type enabling Multipoint-to-Multipoint (MP-to-MP) connections from Provider Edge (PE) 1 to Provider Edge (PE) 2 as well as Provider Edge 3.

FIG. 9 illustrates an embodiment of an architecture using an Ethernet Pseudowire Type Point-to- Multipoint (Pt-to-MP) connection with L2TPv3 over DOCSIS Encapsulation in the Access. In this illustration the L2TPv3 Ethernet Pseudowire Type defined as Point-to-Multipoint (Pt-to-MP) enables an Ethernet connection to be multiplexed at the User Network Interface (UNI) with two (2) connections or more at the Provider Edge 1 and establishing 2 or more provider edge connection points. An ingress frames at one of the UNIs (Provider Edge 1) can be an egress frame at one or more of the other UNIs destination Ethernet Virtual Circuit (EVC) defined by VLAN ID.

The CEoD enabled DOCSIS CPE may have optional support for true Multipoint-to-Multipoint services, which will support services defined by the Metropolitan Ethernet Forum (MEF)'s for E-LAN services and the IEFT's Virtual Private LAN Service (VPLS). The CEoD enabled DOCSISCI CPE configured with a Virtual Switch Instance (VSI) (may be referred to as Virtual Switch Interfaces) will support true MP-to-MP services. The use of a VSI is not required for the CEoD enabled DOCSIS CPE to perform Point-to-Point services as defined in E-Line. A CEoD enable DOCSIS CPE emulates IETF and MEF defined Multipoint services at the CPE, without the requirement of additional Network-based systems.

Figure lo illustrates an embodiment of an architecture using an Ethernet Pseudowire Type enabling Multipoint-to-Multipoint (MP-to-MP) connections from Provider Edge (PE) 1 to Provider Edge (PE) 2 as well as Provider Edge 3. In this illustration routing protocols are used by the CE to direct traffic to specified endpoints and traffic is carried transparently through the service provider's DOCSIS and Packet Switch Network and even the public Internet. The Cable Operators using specially architected L2TPv3 enabled DOCSIS CPE devices may transport Layer 3 routed network traffic similar to that of Frame Relay network service providers. The L2TPv3 Enabled DOCSIS CPE requires separate physical interfaces for multiple routed destinations, the emulation service will appear as if the routers are physically (port-to-port) connected, the control and data plane will be transported across the L2TPv3 Enabled DOCSIS CPE. The Customer Edge facing interfaces are mapped into L2TPv3 sessions that will be mapped into DOCSIS service flows.

Figure 11:
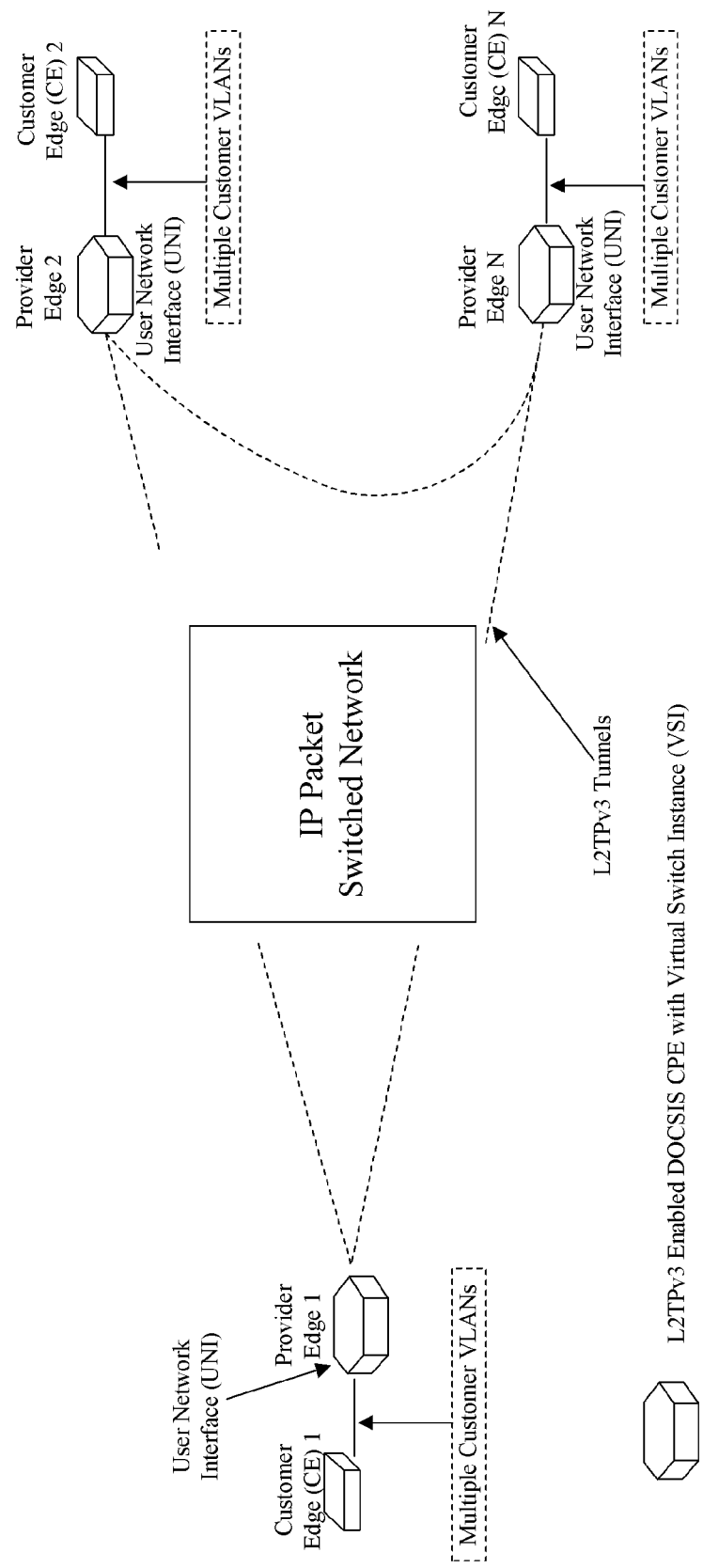
FIG. 11 illustrates an embodiment of an architecture to increase L2TPv3 to perform Multipoint-to-Multipoint Layer 2 services.

FIG. 11 illustrates an embodiment of an architecture to increase L2TPv3 to perform Multipoint-to-Multipoint Layer 2 services. The Customer Edge (CE) connects to the Provider Edge (PE) using 802.1q. The L2TPv3 Enabled DOCSIS CPE with Virtual Switch Instance (VSI) is the PE and emulates an IEEE Ethernet bridge. This architecture allows the L2TPv3 Enabled DOCSIS CPE with VSI to perform flooding, forwarding, and learning with multiple LCCE VSI endpoints (example has 3 PEs). The CE has port or VLAN-based membership through the VSI located in the PEs, and the PE performs packet replication and establishes the L2TPv3 Tunnels to participating PEs. This provides Multipoint service and all devices are direct peers and all VLANs are presented to all locations and the customer BPDUs are transparent.

Figure 12:
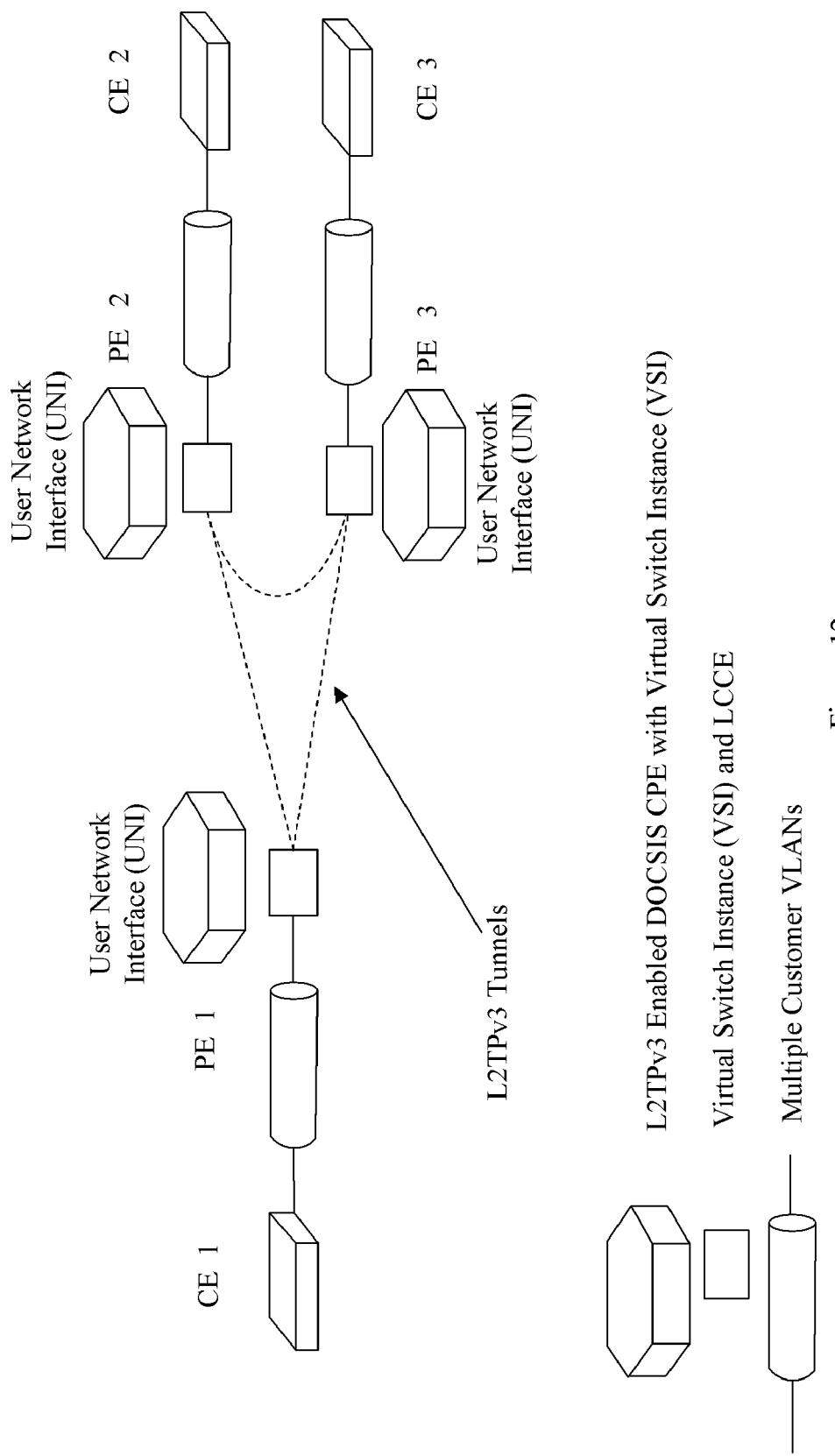
FIG. 12 illustrates an embodiment of an architecture using an Ethernet Pseudowire Type Multipoint-to-Multipoint (MP-to-MP) connection with L2TPv3 over DOCSIS enabled CPE with VSI.

FIG. 12 illustrates an embodiment of an architecture using an Ethernet Pseudowire Type Multipoint-to-Multipoint (MP-to-MP) connection with L2TPv3 over DOCSIS enabled CPE with VSI. In this illustration the L2TPv3 Ethernet Pseudowire Type defined as Multipoint-to-Multipoint (MP-to-MP) enables an Ethernet connection to be multiplexed and/or non-multiplexed at the User Network Interface (UNI) with two (2) or more connections at the Provider Edge locations. The L2TPv3 DOCSIS device may have MAC address learning and aging as well as forwarding and packet replication techniques. The device may actually perform switching for the customer private network. The Customer Edge device may be a switch; however a router may have best desired result.

The use of L2TPv3 enabled DOCSISCI CPE with VSI capabilities supports a network architecture we are calling Hierarchical L2TPv3. The use VSIs and L2TPv3 offers advantages over the hub and spoke designs or full flat mesh architectures that have the common scaling problem of N*(N−1). In a hub and spoke all of the traffic terminates at the hub and then is retransmitted to the desired spoke locations, this has higher costs in terms of bandwidth (paying for traffic twice) as well as lowers performance. The L2TPv3 enabled DOCSIS CPE configured with VSI, will establish L2TP Tunnels to all of the participants.

The CEoD architecture considers traffic classification and Quality of Service (QoS) treatments essential requirements for many business customers and service providers.

The CEoD defines the mapping of Customer Edge (CE) traffic into QoS of service mappings for the IP packet switch network as well as into DOCSIS packet classifiers and service flows for ingress and egress traffic across a two-way DOCSIS system and across an IP or MPLS enable packet switch network. The section will describe the techniques of mapping CE and L2TP traffic types into DOCSIS classifiers and service flows for Quality of Service across DOCSIS systems. Examples may include voice traffic could have greater priority over best effort data flows and another example may include support for Committed Information Rate (CIR) and Excess Information Rate (EIR) for defined traffic types.

The systems and techniques described herein add functionality not defined in the L2TPv3 standards for Quality of Service, to include mapping L2TPv3 QoS into DOCSIS service flows; this feature allows traffic marked by the customer premise equipment (CPE) device and/or marked at the ingress connection point of the L2TPv3 session to be mapped into DOCSIS service flows for Quality of Service and special traffic treatment and priority through the DOCSIS two-way system. The approach may map 802.1p or VLAN ID for the CE into Differentiated Services (DS) field [RFC2474] for the L2TPv3 traffic (Packets) independent of sessions. The approach will allow the DS value to be carried internally to the DOCSIS layer for classification and service flow creation. The approach will also create a new technique that will allow the CE 802.1P/Q packet fields to be placed into L2TP tunnels and the device may then add another 802.1P/Q packet field(s) to the outside of specified L2TP packets. The Cable modem device may identify the user priority based on the service provider 802.1P and/or VLAN ID 802.1Q tag for classification and service flow. The value is that the cable operators can expand the QoS treatment beyond those defined in TOS/DS values. The approach will ensure that the traffic priority, CIR, & EIR information expected from the CE will be mapped into proper classifiers and service flow in the shared DOCSIS access network.

Figure 13:
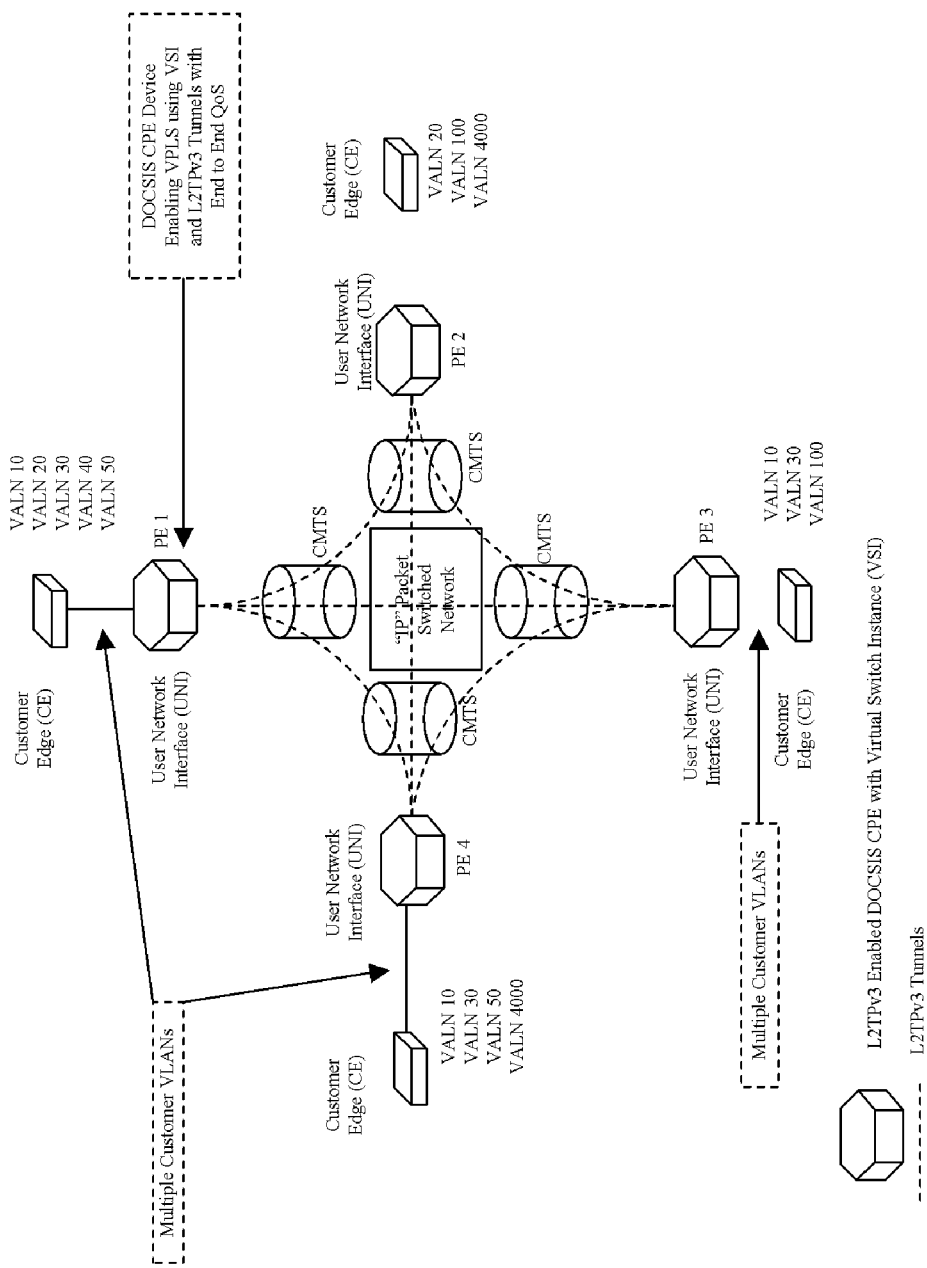
FIGS. 13 and 14 illustrate embodiments of networks including a L2TPv3 enabled DOCSIS CPE with Virtual Switch Instance.
Figure 14:
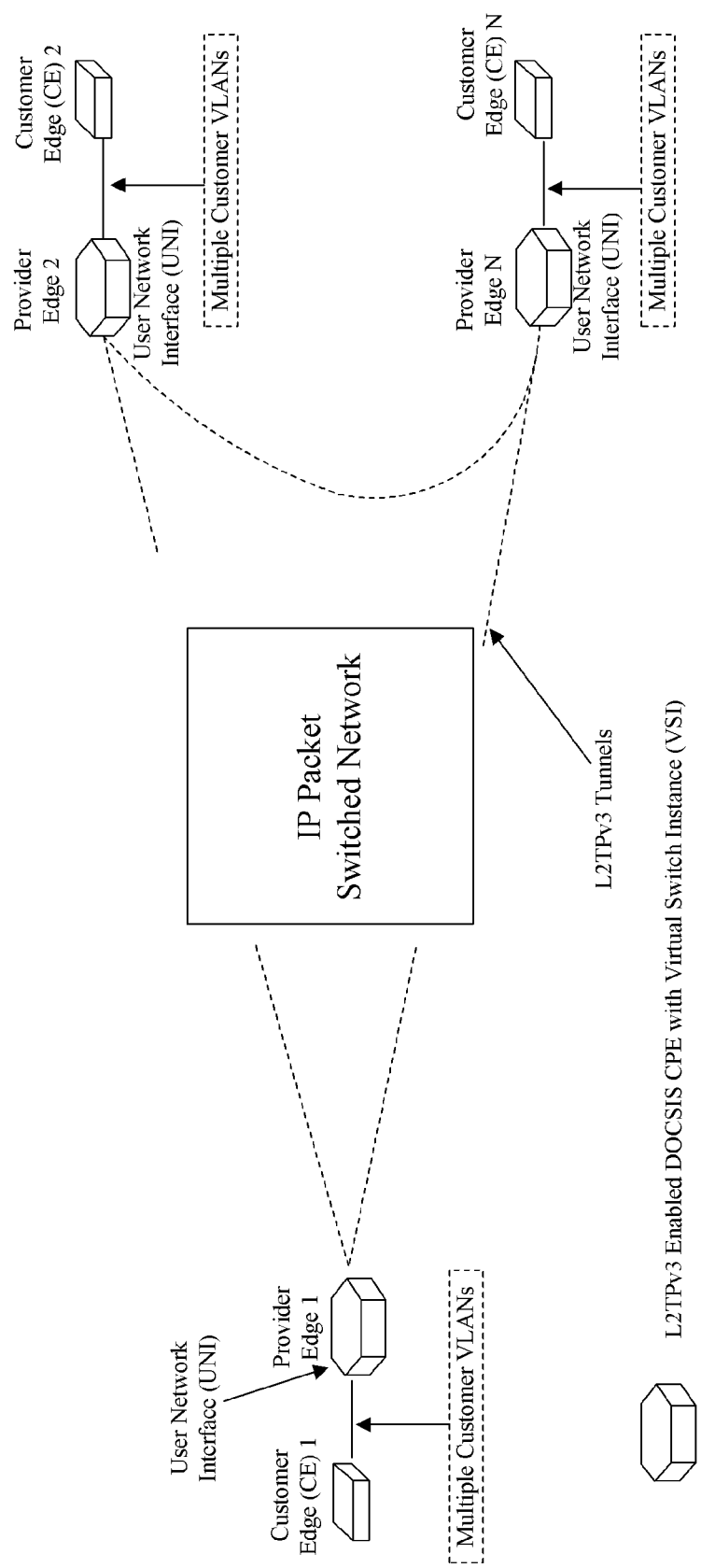

FIGS. 13 and 14 illustrate embodiments of networks including a L2TPv3 enabled DOCSIS CPE with Virtual Switch Instance. The figures illustrate the intelligent edge concept, that is: 1) delivering VLPS from the edge instead of the network core, 2) establishing multiple L2TPv3 tunnel paths for direct peer communications, 3) the L2TPv3 DOCSIS CPE with VSI determines the tunnel path, 4) result is providing layer 2 MP to MP service and ELAN.

Figure 15:
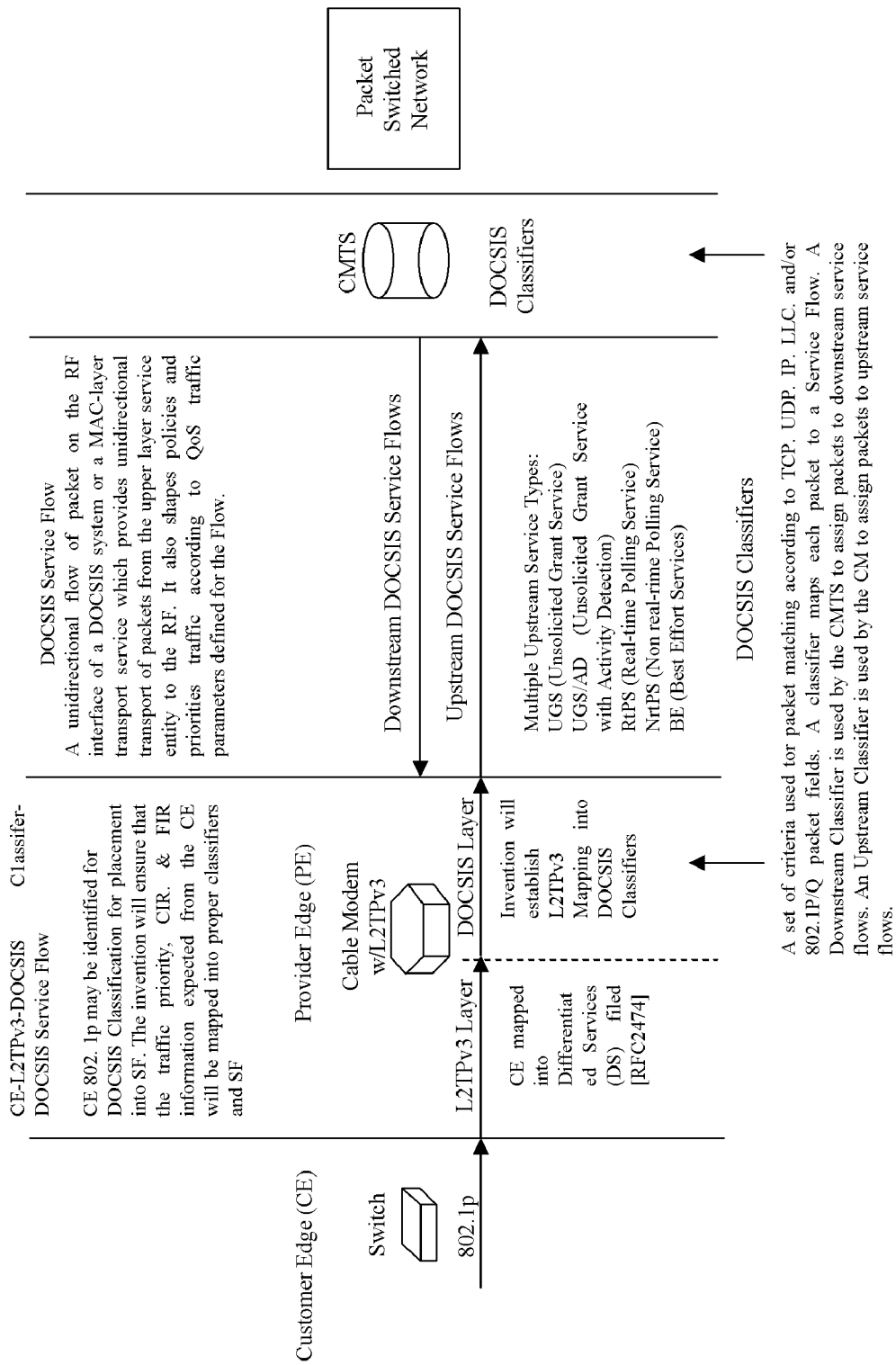
FIG. 15 illustrates an embodiment of a process to add functionality not defined in the L2TPv3 standards for Quality of Service, to include mapping L2TPv3 QoS into DOCSIS service flows.
Figure 16:
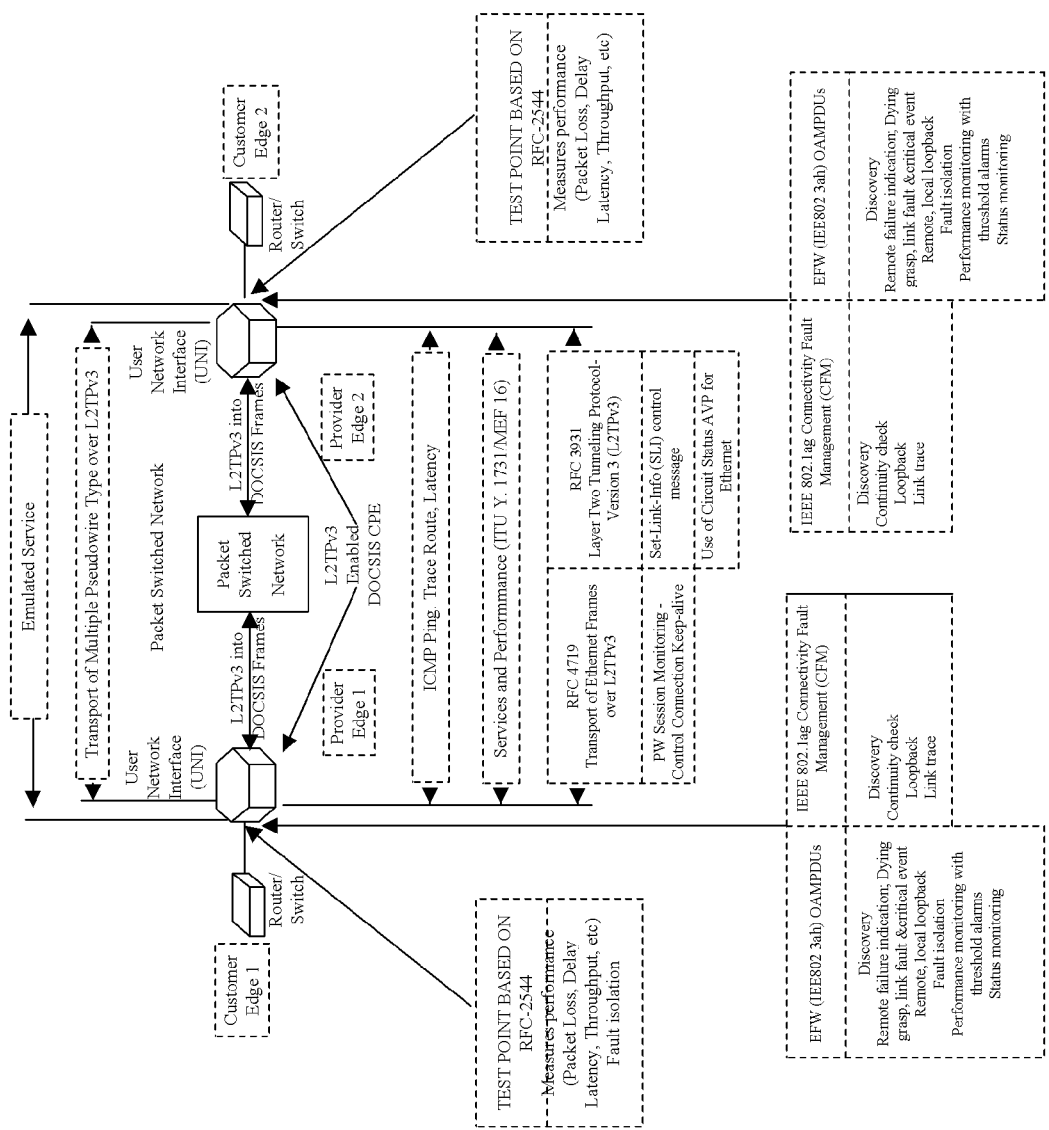

FIG. 15 illustrates an embodiment of a process to add functionality not defined in the L2TPv3 standards for Quality of Service, to include mapping L2TPv3 QoS into DOCSIS service flows, this key feature will allow traffic marked by the customer premise equipment (CPE) device and/or marked at the ingress connection point of the L2TPv3 DOCSIS device to be classified and mapped into DOCSIS service flows for Quality of Services and special traffic treatment and priority through the DOCSIS two-way system. The approach will also include the creation of L2TPv3 tunnels mapped into IPSec and then mapping these tunnels into DOCSIS service flows for Quality of Service and special traffic treatment and priority through the DOCSIS two-way system (not shown in diagram). This will enable L2TPv3 traffic carried across DOCSIS systems traffic classification and Quality of Service (QoS) treatments as well as include support for CIR and EIR for defined traffic types. The L2TPv3 Enabled DOCSIS CPE may perform stacking of L2TPv3 packets into service provider VLAN tags along with 802.1p; this will then be marked into DOCSIS classifiers and into service flow, this addition will allow the Operators to select from a great number of QoS treatments when compared to DS mappings.

The L2TPv3 Enabled DOCSIS CPE may use IP addressing or fully qualified domain name (FQDN) for establishing connectivity between other end points. The use of IP address assignments may create an inventory management challenge, but if static IP address assignment are effectively managed by the services provider this would remain an option. The use of FQDNs may provide the MSOs a solution for automation, by leveraging the PacketCable infrastructure and the use of a configuration file with connection endpoint point. The transaction would be similar to PacketCable provisioning process as well as the connection establishment.

Embodiments of Carrier Ethernet Service as described herein support E-Line, E-LAN & ETree. They utilize a standards-based architecture, reduce network enablement capital, and increase network wide readiness. These features are provided using an Enhanced DOCSIS CPE allowing the existing network to remain transparent to the VPN Tunnel. Using an Enhanced DOCSIS CPE allows for an End-to-End QoS architecture that reduces the number of devices to as "few as possible" requiring operation, administration, maintenance and provisioning service support. Applying an OAM Framework reduces operational complexity. The distributed approach using Enhanced DOCSIS CPE devices enables high scalability. Placing the VPN to the Access Layer enables high reliability. The failure of a Access Layer (CPE enabled VPN) may only cause one customer or site to be affected instead of dozens, hundreds, or thousands.

The Cable industry has several Ethernet over DOCSIS architectures to choose from, including the BSoD L2VPN network based approach, L2TPv3 CPE and Aggregator hybrid approach, and the CEoD a CPE based approach for the support of Ethernet over DOCSIS. The CEoD architectures describe herein avoid network-wide upgrades or in fact any upgrades to the CMTS and does not require additional network equipment north of the CMTS, such as MLSR or VPN Aggregators to initiate or terminate VPN tunnels. The CEoD architectures described herein define the least number of devices to provision for the Layer 2 VPN service, which allows the operators to avoid touching the network layer for VPN service establishment and for ongoing operations support of the VPN service. The CEoD architecture defines only the Access Layer of the Network as the Provider Edge, allowing the Aggregation and Distribution Layers of the network to perform packet switching and priority handling. The CEoD architecture is an Intelligent Access Layer concept for the enablement of the full range of Carrier Ethernet services on a CPE, this architecture remains flexible such that VPN Concentrators may be supported.

Those having skill in the art will appreciate that there are various logic implementations by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A network comprising: a provider edge device comprising machine memory and/or non-transitory machine readable media comprising logic to encapsulate Ethernet frames received from customer equipment into Data Over Cable Service Interface Specification (DOCSIS) frames using Layer Two Tunneling Protocol, and further comprising virtual switch instance logic (VSI); and the machine memory and/or the non-transitory machine readable media comprising logic to map customer edge (CE) and L2TP traffic types into DOCSIS classifiers and service flows by placing CE802.1P/Q packet fields into L2TP tunnels, and to add another 802.1P/Q packet to the outside of specified L2TP packets.

2. The network of claim 1, wherein the VSI logic further comprises:
   logic to perform basic switching.

3. The network of claim 1, wherein the VSI logic further comprises:
   logic to perform Media Access Control (MAC) address learning.

4. The network of claim 1, wherein the VSI logic further comprises:
   logic to perform flooding of unknown frames.

5. The network of claim 1, wherein the VSI logic further comprises:
   logic to perform traffic replication.

6. The network of claim 1, wherein the VSI logic further comprises:
   logic to perform aging of MAC addresses.

7. The network of claim 1, wherein the provider edge device further comprises logic to define Ethernet port-to-port mapping.

8. The network of claim 1, wherein the provider edge device further comprises logic to define connections defined by VLAN type.

9. The network of claim 1, wherein the provider edge device further comprises logic to define Ethernet point-to-multipoint pseudowire.

10. The network of claim 1, wherein the provider edge device further comprises logic to route Ethernet frames to multiple separate physical ports.

11. The network of claim 1, wherein the VSI logic further comprises logic to emulate an Ethernet bridge.

12. The network of claim 1, wherein the provider edge device further comprises logic to define Ethernet a multipoint-to-multipoint pseudowire.

* * * * *